United States Patent Office

3,584,024
Patented June 8, 1971

---

3,584,024
CONDENSABLE ISOCYANATO SUBSTITUTED SILOXANES AND PHOSGENATION PROCESS FOR MAKING SAME
Enrico J. Pepe, Amawalk, N.Y., assignor to Union Carbide Corporation
No Drawing. Continuation-in-part of abandoned application Ser. No. 307,003, Sept. 6, 1963. This application Feb. 7, 1968, Ser. No. 707,365
Int. Cl. C07f 7/10, 7/18
U.S. Cl. 260—448.2N                                                         6 Claims

ABSTRACT OF THE DISCLOSURE

The novel siloxanes of this invention are characterized by the following formula:

(I)
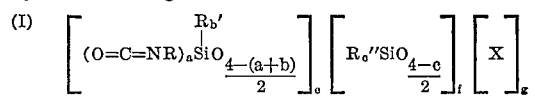

wherein R is a divalent organic radical bonded to silicon by a carbon to silicon bond and separates the O=C=N— from the silicon atom by a chain of at least 3 carbon atoms; R' is an inert monovalent organic radical bonded to silicon by a carbon to silicon bond; X is a member selected from the group consisting of halogen (such as chlorine, fluorine or bromine),

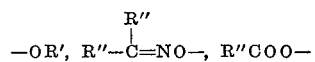

and mixtures thereof; $a$ has a value of 1 to about 3, $b$ has a value of 0 to about 2; with the proviso that the value of $(a+b)$ is not greater than 3; R'' represents hydrogen or R'; $c$ is 0 to 3; $e$ is a number equal to at least 1; $f$ is 0 or a positive number and $g$ is a positive number, and the sum of $e$ and $f$ is a number of at least 2. The process of this invention to produce siloxanes of Formula I involves the phosgenation of an aminoorganosiloxane of the following formula:

(II)
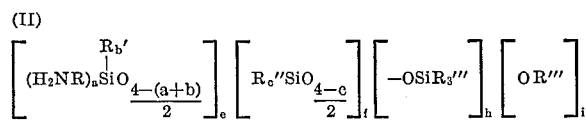

wherein R, R', R'', $a$, $b$, $c$, $e$, and $f$ have the definition ascribed to them above, R''' is any monovalent organic radical such as defined for R' as well as organic radicals which are reactive with phosgene, $h$ is 0 or a positive number and $i$ is 0 or a positive number, and the sum of $h$ and $i$ is not smaller than the value of $g$; preferably they are equal to the value of $g$.

---

This application is a continuation-in-part of application Ser. No. 307,003, filed Sept. 6, 1963, now abandoned.

This application relates to novel condensable siloxanes containing isocyanato-organofunctional groups and to a novel process for producing them. In addition, the process of this invention finds great utility in making unique isocyanato substituted silanes. The isocyanato substituted silanes and siloxanes as mentioned above are characterized by having the isocyanato group bonded to an organic moiety which is directly bonded to silicon by a carbon to silicon bond.

There is described in U.S. Pat. 3,170,891, patented Feb. 23, 1965, a method or making organosilicon compounds containing the isocyanate functional radical. The patent describes only compositions that are allegedly obtainable by the processes described in the patent. This patent states that certain isocyanato silanes and siloxanes can be made by reacting a siloxane hydride with an ethylenically unsaturated isocyanate using conventional procedures or by reacting an amino organosilicon compound with phenyl chloroformate, see column 3, line 55, and column 5, line 19, and the isocyanate is obtained by decomposing the carbamate product. In making siloxanes, both methods treat only fully condensed siloxanes, and in the case of the second method, any silane which is treated possesses phenoxy groups directly bonded to silicon. Since the isocyanate group is susceptible to reaction in the presence of water, the isocyanato silanes cannot be converted to siloxane without first destroying the isocyanate groups. It is clearly noted that all of the examples of this patent, as well as the general disclosure thereof, so far as it pertains to siloxanes, is restricted to fully condensed siloxanes, that is, siloxanes which do not contain a residual amount of chlorine, alkoxy, aryloxy, or hydroxy groups bonded to silicon which on further treatment can be caused to form additional siloxane linkages to increase the molecular weight thereof.

It is stated in U.S. Pat. No. 3,178,391 that when an aminoorganooxysilicon compound is treated with phosgene, ester groups are not cleaved and replaced with chloro groups. This is apparently significant because if phosgene were to cleave ester groups, and it was desired to convert the chloro groups to alkoxy (that is, ester), it would be necessary to react the isocyanatoorganooxy silicon compound with alcohol and this would result in converting any isocyanate group to carbamate. U.S. Pat. No. 3,178,391 is an apparently clear teaching that phosgenation of amino organic silicon compounds does not result in cleavage of alkoxy groups. One might say that U.S. Pat. No. 3,170,891 at column 5, lines 10 et seq., suggests the same thing by the reaction of phenyl chloroformate with aminoorgano silanes containing phenoxy groups since the chloroformate does not, according to that patent, split off phenoxy and add chlorine to the silicon atom.

There is described herein a whole new class of isocyanato substituted siloxanes. This new class of siloxanes possesses residual organooxy and/or chlorine groups directly bonded to silicon thereby allowing one to not only effect reaction through the functional isocyanato group, but to also achieve reaction through residual hydrolyzable and condensible groups. Such compounds are much more useful in that these hydrolyzable or condensible groups need not be reactable under the conditions by which the isocyanato group reacts or can be reacted under conditions under which the isocyanato group does not react.

The process of this invention involves the phosgenation of aminoorgano substituted siloxanes which contain at least one of the following: (a) a siloxy atom which contains at least three organo groups bonded thereto by a carbon to silicon bond and/or (b) organooxy containing silyloxy units.

The novel siloxanes of this invention are characterized by the following formula:

(I)
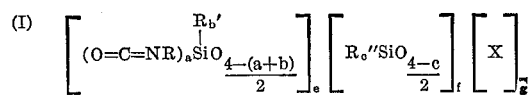

wherein R is a divalent organic radical bonded to silicon by a carbon to silicon bond and separates the O=C=N— from the silicon atom by a chain of at least 3 carbon atoms; R' is an inert monovalent organic radical bonded to silicon by a carbon to silicon bond; X is a member selected from the group consisting of halogen (such as chlorine, fluorine or bromine),

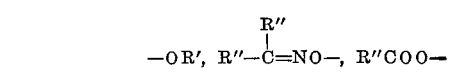

and mixtures thereof; $a$ has a value of 1 to about 3, $b$ has a value of 0 to about 2; with the proviso that the value of (a+b) is not greater than 3; R" represents hydrogen or R'; c is 0 to 3; e is a number equal to at least 1; f is 0 or a positive number and g is a positive number, and the sum of e and f is a number of at least 2.

The process of this invention to produce siloxanes of Formula I involves the phosgenation of an aminoorganosiloxane of the following formula:

(II)

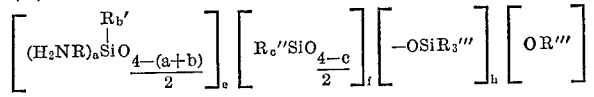

wherein R, R', R", a, b, c, e, and f have the definition ascribed to them above, R''' is any monovalent organic radical such as defined for R' as well as organic radicals which are reactive with phosgene, h is 0 or a positive number and i is 0 or a positive number, and the sum of h and i is not smaller than the value of g; preferably they are equal to the value of g.

Illustrative of the divalent organic radicals represented by R in Formulae I and II above are divalent hydrocarbon radicals such as straight or branched chain alkylene groups such as n-propylene, n-butylene, isobutylene, n-amylene, n-decylene, n-octadecylene, 2-ethylhexylene; arylene radicals such as p-phenylene, ethyl-p-phenylene, 2,5-naphthylene, p,p'-biphenylene, and the like; cycloalkylene groups such as cyclopentylene, cyclohexylene; alkaralkyl radicals such as xylylene, 1,4-dimethylenephenylene, and the like; and divalent ether radicals such as

—CH₂CH₂OCH₂CH₂CH₂—

—CH₂CH₂O—⟨C₆H₄⟩— and the like. Preferably, R contains from 3 to 10 carbon atoms, and more preferably R is a phenylene (C₆H₄), phenyleneethyl (—C₆H₄C₂H₄—), or a polymethylene chain, —(CH₂)ₙ— wherein n has a value of from 3 to 5 inclusive.

Illustrative of the monovalent organo radicals represented by R' are monovalent organic radicals which are unreactive to phosgene in the aforementioned phosgenation reaction, for example, monovalent hydrocarbon radicals such as straight or branched chain alkyl groups such as methyl, ethyl, n-propyl, isopropyl, n-butyl, isoamyl, n-hexyl, n-decyl, and n-octadecyl, and the like; the cycloalkyl groups such as cyclopentyl, cyclohexyl and bicycloheptyl, and the like; aryl groups such as phenyl, 2-naphthyl, p-phenylphenyl, and the like; the alkaryl groups such as tolyl and xylenyl, and the like; and the aralkyl groups such as benzyl and phenylethyl, and the like; alkenyl such as vinyl, allyl, 3-butenyl, and the like; ether radicals such as methoxypropyl, propoxypropyl, and the like; halogenated monovalent hydrocarbons such as 2-chloropropyl, 3-chloropropyl, 3,3,3-trifluoropropyl, and the like; cyanoalkyl such as cyanoethyl, 3-cyanopropyl, 6-cyanohexyl, and the like. Preferably R' is alkyl containing from 1 to 10 carbon atoms or phenyl, i.e. C₆H₅—. More preferably R' is methyl. As stated above, R' is an inert radical, and this means that it is free of groups which are reactive with phosgene during the reaction, such as hydroxyl, amino, amido, mercapto, and the like.

R''' is a monovalent organic radical such as R' as well as organic radicals which can react with phosgene under the reaction conditions, such as H₂NR—, HOR, HSCH₂CH₂—, HSR—,

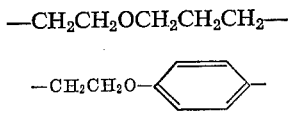

and the like.

Illustrative of siloxanes of Formula I are:

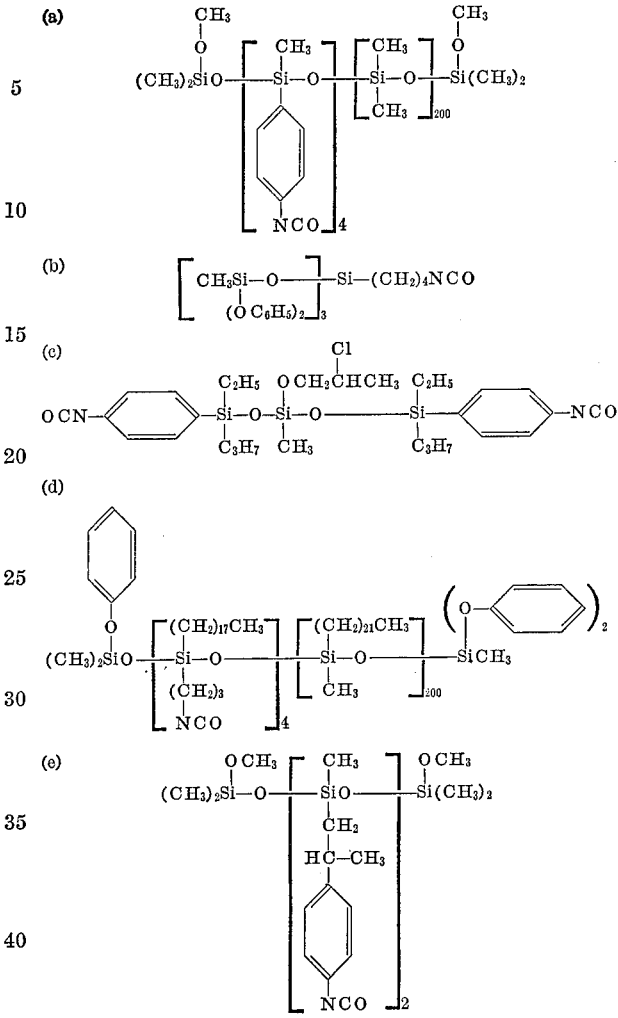

Isocyanato-substituted hydrolyzable silanes cannot be hydrolyzed in the presence of water to produce siloxanes without decomposing the isocyanato group. On the other hand, aminoorgano hydrolyzable silanes are readily hydrolyzable to produce siloxanes which contain the amino group intact. In addition, these aminoorgano hydrolyzable silanes can be homopolymerized or copolymerized to produce siloxanes containing residual triorgano siloxy terminating groups or organooxy terminating groups.

It has been found that when aminoorgano containing siloxanes which possess either triorgano siloxy and/or organooxy units therein are phosgenated, triorganosiloxy and/or organooxy groups are cleaved from the siloxane and are substituted for by chlorine, that is, chlorine directly bonded to silicon in the siloxane. At the same time, amino groups are converted to isocyanate.

This siloxane can be used as such, but because silicon-bonded chlorine in the siloxane is readily susceptible to hydrolysis in the presence of moisture thereby requiring moisture-free environment for storing the chlorine containing siloxane, it is best to replace the chlorine groups with a more hydrolytically stable group such as organooxy, for example, alkoxy, aryloxy, acyloxy and R"₂NO—. It has been surprisingly found that one may treat such chloride containing siloxane possessing isocyanate groups with 1,2-alkylene oxides, alcohols, phenols, carboxylic acids and ketoximes or aldoximes in the presence of a hydrohalide acceptor such as tertiary amines (for example, trialkylamines, pyridine, N-alkylated cycloalkylene amines such as alkyl morpholines, dialkyl piperazine, and the like), tertiary alkylene amines (such as triethylene diamine, and the like) to replace the chlorine with hydrocarbonoxy, acyloxy, oximyl, and the like radicals, without causing reaction of the isocyanate groups. Thus the resulting polymer still possesses residual isocyanate which contains more stable condensation groups than chlorine. Particularly preferred organooxy groups which exhibit substantial stability are the methoxy, ethoxy, 2-chloropropoxy, phenoxy, acetoxy, dimethylketoximyl or acetaldoximyl.

The relative proportions of phosgene to the amino groups of the aminoorganosiloxane, specifically aminohydrocarbyl siloxane is not a narrowly critical factor, but for efficient and complete reaction it is preferred to employ approximately 3 to 5 times the stoichiometric requirement of phosgene. Stoichiometrically, one molecule of phosgene is necessary to covert one —$NH_2$ groups to an —N=C=O group. Thus, for each mole of aminoorgano group in the siloxane the theoretically required mole amount of phosgene is equal numerically to the average number of —$NH_2$ groups present in the aminoorgano siloxane, e.g., the aminoalkyl or aminoaryl siloxane molecule.

Although not wishing to be bound by any particular theory or reaction mechanism, it is believed that the reaction of the aminoalkyl or aminoaryl siloxane with phosgene proceeds by a two-step reaction in which the products of the first reaction are a carbamic acid chloride and an amine hydrochloride, which intermediates are each converted to the desired isocyanate by additional phosgene. In equation form these reactions are (R represents an alkylene or arylene moiety):

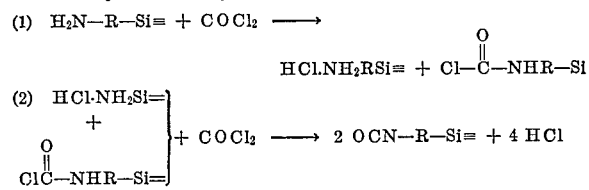

The first Reaction 1 is favored by relatively low temperatures, generally of the order of about —20° C. to about 25° C., whereas the second Reaction 2 is generally favored by elevated temperatures. Generally, the reaction can be run at temperatures between about 0° C. to about 200° C. In general optimum results are obtained from the second reaction step in the case of aminoalkylsiloxanes by employing temperatures within the range from about 100° C. to 200° C., preferably about 175° C. In the case of aminoarylsiloxanes temperatures of from about 50° C. to about 100° C. are preferred in order to avoid splitting of siloxane bonds with a consequent lessening of yield. It is, therefore, advantageous to initially contact the amino siloxane with phosgene at low temperatures and slowly raise the reaction temperature and the reaction progresses until reaction is substantially complete.

It has been determined that during phosgenation of an aminoorganosiloxane containing triorganosilyl and/or alkoxysilyl moieties, at least some, and in many cases all, of the triorganosilyl and alkoxysilyl moieties are cleaved from the siloxane and are replaced by chlorine radicals. This has been particularly noted when the phosgenation reaction is run at about 0° C. to about 150° C. though the higher and lower temperatures mentioned above would be expected to achieve the same result. The basis for such cleavage is not clearly understood though it is believed to occur by attack of the bond linking these moieties to the siloxane by either phosgene or phosgene by-product. This is most surprising since one would expect diorganosiloxane and monoorganosiloxane (e.g., $R''_2SiO$ and $R''SiO_{1.5}$) to be similarly cleaved yet experimental evidence shows they are not attacked.

A desirable means of obtaining intimate contact between the reactant materials is the utilization of an inert organic solvent medium in which at least the phosgene is soluble and preferably the aminohydrocarbyl silicon also. Illustrative of these conventional solvents are toluene, benzene, chlorobenzene, 4-chloroethylbenzene, xylene, and carbon tetrachloride. Preferably the solvent is a high boiling halogenated hydrocarbon. When necessary to raise the boiling temperature of a desired solvent to attain optimum reaction temperatures, superatmospheric pressures can be employed, with provision being made for the removal of HCl from the reaction system. Reactions are generally carried out under normal atmospheric or slightly reduced pressures using an inert gas purge such as nitrogen or helium.

The above reaction proceeds with great facility and effects substantial conversion of the amino groups to isocyanato groups. Thus, a copolymer siloxane containing, for example, aminoalkyl methylsiloxy groups and dimethylsiloxy groups can be essentially converted to isocyanatoalkylsiloxane copolymer. Such a product is free of active silicon-bonded hydrogen and thus is stable over longer periods of time without premature crosslinking taking place. For example, a copolymer containing isocyanatoalkylmethylsiloxy units, methylhydrogensiloxy units and dimethylsiloxy units provides an active hydrogen in the form of silicon hydride which reacts with the free isocyanate causing crosslinking of the copolymer.

The resulting isocyanatoorganosiloxane containing chlorine directly bonded to silicon can be treated to replace the readily hydrolyzable chlorine with a less hydrolyzable group, if such is desired. As pointed out above, this can be achieved without reacting the isocyanato groups by mixing a tertiary amine, as described above, with the siloxane and the compound providing the replacing group. Such compounds may be practically any compound possessing a 1,2-alkylene oxide group, alcoholic hydroxyl group, phenolic hydroxyl group, carboxyl group, and oxime group (such as ketoxime and aldoxime).

Illustrative 1,2-alkylene oxides include, by way of example, ethylene oxide, 1,2-propylene oxide, epichlorohydrin, 1,2-butyleneoxide, 1,2-cyclohexylene oxide, and the like monoepoxides. Illustrative alcohols include, by way of example, alkanols having 1 to 5 carbon atoms such as methanol, ethanol, n-propanol, isopropanol, n-butanol, 2-methyl-n-propanol, amyl alcohol, and the like; arylalkanols such as hydroxymethyl benzene, 2-hydroxyethyl-naphthalene ad the like; cycloalkyl alcohols such as hydroxycyclohexane hydroxycyclopentane hydroxymethyl-cyclobutane and the like. Illustrative of suitable compounds containing phenolic hydroxyl include phenol, 4-methylphenol, 3-methylphenol, 2,4-dimethylphenol, and the like. Suitable acyl compounds include monocarboxylic acids such as the lower fatty acids containing from 1 to 7 atoms such as formic acid, acetic acid, proprionic acid, butyric acid n-pentanoic acid and the like. Illustrative ketoximes include alkyl and aryl ketoximes such as dimethylketoxime, methylethylketoxime, methylphenylketoxime, dibutylketoxime, diphenylketoxime, and the like. Suitable aldoximes include methylaldoxime, ethylaldoxime, phenylaldoxime, and the like.

The following examples serve to illustrate this invention but not to restrict it. The designation "Me" in the following examples means $CH_3$—.

EXAMPLE 1

Into a 1 liter, 3-necked flask fitted with mechanical stirrer, thermometer, Dry Ice condenser and gas inlet tube was charged 188 milliliters of dry toluene and 30 grams of phosgene. The gas inlet tube was replaced by a dropping funnel containing 364 grams of 1248 centistokes (determined at 25° C.) of Aminosilicone A having the formula

and 188 milliliters of toluene. Starting at about 25° C., the contents of the dropping funnel were run into the stirring toluene-phosgene mix over a period of 20 minutes. Over this period viscosity increased significantly and the reaction temperature rose to only 30° C., with no significant phosgene reflux. After an additional 20 minutes mixing period, the stirred mixture was heated to reflux. While refluxing at from 60–98° C., a smooth evolution of HCl was observed over a total period of about 2 hours and a marked viscosity decrease resulted. After an additional 30 minute reflux of phosgene-toluene to insure completeness of the reaction, the phosgene was sparged out of the system with dry nitrogen bubbled through the mixture and neutralized with concentrated ammonium hydroxide. The concentration of residual acid in the clear, colorless reaction mixture was determined and neutralized by adding at room temperature a 10 mole-percent excess of both dry ethanol and triethylamine. Triethylamine hydrochloride formed immediately and the mixture was stirred for an additional 20 minutes before heating and sparging with nitrogen to 150° C. to remove all light fractions. Filtration through a 1/100 micron pore size pad at 20 pounds per square inch in a pressure filter removed the (C₂H₅)₃N·HCl yielding a clear, colorless, neutral isocyanate derivative (viscosity at 25° C. equals 536.6 centistokes, NCO content equals 0.197 moles/kg.– 0.21 calc.) of the formula

[EtOSiMe₂O[Δ—OCN(CH₂)₄SiMeO]₃[Me₂SiO]₁₇₄—SiMe₂OEt]*

*"Et" means CH₃CH₂—.

EXAMPLE 2

Employing the procedure of Example 1, 800 grams of aminosilicone A was phosgenated and the Si—Cl terminated isocyanate derivative was treated with a 5 mole percent excess of an equimolar mixture of phenol and triethylamine at room temperature. The neutral phenoxy endblocked silicone isocyanate had a viscosity of 558.9 centistokes at 25° C. and a NCO titer of 0.200 mole per kilogram.

Infrared verified

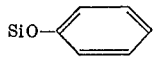

by characteristic absorption at 1595, 1490 and 920 centimeters⁻¹. Significantly no NH, OH or C=O was detected. Linear dimethylsiloxy and —N=C=O were principally detected indicating that the compound had the following formula:

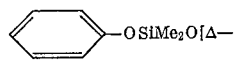

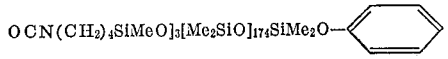

EXAMPLE 3

Into a three liter, 3-necked flask containing 100 grams of phosgene and 250 milliliters of toluene at about 10° C. was added over ¾ hour, 325 grams of an aminophenyl silicone fluid diluted with 450 milliliter toluene. The aminophenyl silicone fluid has the following formula:

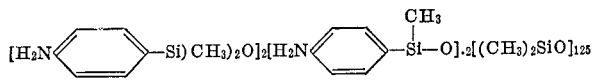

The mixture was brought to 90° C. over about 1½ hours and purged with nitrogen over ¾ hour to 65° C. and stripped to 170° C. in a vacuum to give a clear, almost colorless, isocyanate derivative possessing a residual acidity (determined by back titration of excess .1 Normal sodium hydroxide with .1 Normal HCl using Brom Cresol Propyl as indicator) of .007 milli-equivalents Cl⁻/gram. By adding 100 percent excess propylene oxide (0.14 milli-equivalent/gram) based on the equivalent amount of chloride, with momentary checking and standing for 62 hours at 25° C., there was obtained on stripping a neutral product (847 centistokes at 25° C.) possessing a small amount of

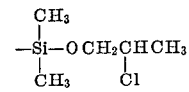

end groups.

This example illustrates that propylene oxide can be employed to replace residual chloride without the use of a tertiary amine-hydrogen chloride acceptor, though such acceptors can be employed, if desired.

EXAMPLE 4

A mixture of 15.8 grams of

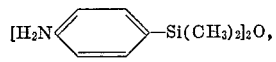

37.5 grams of

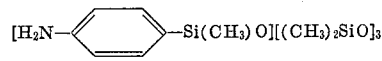

cyclic tetramer, 446.7 grams of a mixture of cyclic dimethylsiloxanes and 0.1 gram of tetramethyl quaternary ammonium hydroxide was stirred for 21 hours at 90±2° C., finally to 150° C., stripped of 49 grams of light fractions at maximum vacuum to yield 451 grams of a light yellow fluid having a viscosity of 354.6 centistokes at 25° C. containing .426 mole/kilogram NH₂. Into a ½ liter, 3-neck flask with Dry Ice condenser, dropping funnel, thermometer and stirrer was charged 9 grams of phosgene and 150 milliliters of toluene. While stirring the phosgene-toluene mixture at 10±2° C., there was added to the flask over 20 minutes, 75 grams of the above fluid diluted with 120 milliliters of toluene. The mixture was heated to reflux for 5 minutes, and nitrogen was bubbled through the mixture with the condenser removed while simultaneously heating the mixture to strip out unreacted phosgene. The temperature of the mixture eventually reached 110° C. There was obtained a clear, light yellow isocyanato phenyl containing fluid possessing 0.036 milli-equivalent chloride per gram. The fluid was neutralized with propylene oxide as discussed in the preceding example to give a neutral 321 centistokes product that analyzed 0.422 mole NCO per kilogram and less than .04 mole per kilogram of

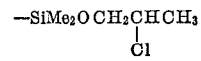

EXAMPLE 5

An equilibrated silicone fluid having a viscosity of 89.3 centistokes at 25° C. prepared according to the procedure described in Example 4 containing 4.8 weight per cent delta-aminobutylmethyl siloxy units was reacted with phosgene. There was employed 132 grams of fluid. It was reacted with 20 grams of phosgene, then neutralized to remove traces of Si-Cl acidity with phenol and triethylamine, as described above, and filtered free of triethylamine hydrochloride. There was obtained a clear, light yellow, neutral isocyanate fluid with a viscosity of 110 centistokes at 25° C. ($n^{25}$ 1.4081) and

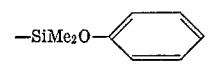

endblocking groups.

EXAMPLE 6

Into a 1-liter, 3-necked flask fitted with stirrer, thermometer and thermo-regulator was charged 222.5 grams (3.0 moles) of dimethylsiloxane mixed cyclics, 13.3 grams (.06 mole) of freshly distilled gamma-NH₂(CH₂)₃Si(OC₂H₅)₃ and .24 gram (.1 weight percent) of NMe₄OH. The stirred mixture was heated for 21 hours at 90° C. in a closed system under a nitrogen atmosphere. The contents were quickly brought to 160° C. under vacuum, collecting 24 grams (10 weight percent of charge) of a gamma-aminopropyl containing siloxane free of light fractions. Filtration through heavy 4-H paper with the aid of vacuum gave a clear, colorless (74.6 centistokes at 25° C.) fluid that titrated .28 mole NH$_2$/kg. [.28 calculated].

Into a 1-liter, 3-necked flask fitted with Dry-Ice bath and condenser, thermometer, dropping funnel and protected from the atmosphere by a nitrogen purge at the condenser exit was charged 11 grams of phosgene (4 molar equivalents-based on NH$_2$) and 100 milliliters of toluene. The mixture was cooled to —20° C. and 100 grams of the above described aminoorganosiloxane copolymer diluted with an equal volume of toluene was added over 15 minutes, maintaining the temperature below 0° C. The mixture was brought to reflux for 1 hour with the pot temperature slowly rising to about 80° C. Lights were distilled out to a pot temperature of 120° C. and the residue was stripped to 120° C./1 millimeter Hg. The resulting isocyanate derivative, weighing 98 grams, titrated 0.37 mole/kg. of Cl⁻(hydrolyzable). The latter was taken up in 2 volumes of hexane and 20 mole percent excess of phenol (4.1 grams and 30 mole percent excess triethylamine (5.0 grams) dissolved in 10 milliliters of toluene was added at room temperature .The calculated amount (~5.0 grams of (C$_2$H$_5$)$_3$N·HCl was readily removed by filtration through a medium fritted glass funnel. Vacuum stripping of solvent and other lights to 120° C./1 millimeter Hg gave 100 grams of a neutral, clear, light yellow (86.8 centistokes at 25° C.) fluid of expected NCO content and

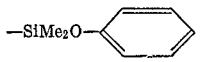

end-blocker.

Under the same condition of reaction employing 20 molar equivalents of phosgene (based on —NH$_2$) the isocyanate derivative was obtained in comparable yield containing 0.35 mole/kilogram Cl⁻/hydrolyzable). Neutralization with phenol-(C$_2$H$_5$)$_3$N, as previously described, gave a 138.3 centistokes at 25° C., clear, light yellow, neutral fluid containing 0.18 mole/kilogram of N=C=O.

EXAMPLE 7

Into a 2 liter, 1 neck distillation flask fitted with a magnetic stirrer, mantle and attached to a 1 foot column packed with Helipak was charged 221.4 grams (1 mole) of gamma-NH$_2$-(CH$_2$)$_3$Si(OC$_2$H$_5$)$_3$, 962 grams (6 moles) of hexamethyldisiloxane and 2.3 grams (0.2 weight percent) of tetramethyl ammonium hydroxide. The stirred mixture was brought to reflux and approximately 300 grams of Me$_3$Si(OC$_2$H$_5$) was collected at the head. The contents were cooled and 10 grams of solid CO$_2$ were added to neutralize the catalyst. Filtration and distillation through a 2½ foot Vigreaux column isolated a mixture boiling at from 55° C./0.25 millimeter Hg to 120°/0.05 millimeter Hg. Fractionation of the mixture through a 2 foot column packed with .05″ x .1″ x .1″ stainless steel Helipak isolated gamma-NH$_2$(CH$_2$)Si(OSiMe$_3$)$_3$. Gas chromatographic analysis reported 97.2 percent purity had been obtained. It had the following properties: B.P. 152° C./47 millimeters Hg, $n^{25}$ 1.4110, N.E. 354.2 [353.7 calculated].

Calculated for C$_{12}$H$_{35}$Si$_4$O$_3$N: 40.7% C; 10.0% H; 31.8% Si; 3.96% N. Analysis: 41.2% C; 10.4% H; 31.0% Si; 3.6% N.

Phosgenation of 110 grams of gamma-NH$_2$(CH$_2$)$_3$Si(OSiMe$_3$)$_3$ with 4 equivalents of phosgene, as described in the previous examples, followed by neutralization of the resulting product containing 28 meq./gram of residual Cl⁻ with (C$_2$H$_5$)$_3$N and MeOH in dry isopropyl ether produced 8 grams of (C$_2$H$_5$)$_3$N·HCl indicating a maximum of 18.6 mole percent of end-blocker cleavage.

In addition to the expected amount of

γ-OCN(CH$_2$)$_3$Si(OMe)(OSiMe$_3$)$_2$ distillation isolated 61 mole percent of γ-OCN-(CH$_2$)$_3$Si(OSiMe$_3$)$_3$ B.P. 168.5° C./43 millimeter Hg, $n^{25}$ 1.4119, N.E. 380.0 [379.7 calculated].

Calculated for C$_{13}$H$_{33}$Si$_4$O$_4$N: 41.1% C; 8.8% H; 29.6% Si; 3.7% N. Analysis: 41.2% C; 9.0% H; 29.2% Si; 3:5% N.

EXAMPLE 8

Over a period of 20 minutes, 20 grams of

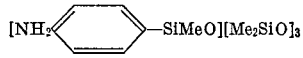

cyclic tetramer was added to 40 grams of phosgene dissolved in 100 milliliters of toluene cooled to —10° C. The mixture was brought to 100° C. over 3 hours time to complete reaction and remove dissolved gas with dry nitrogen. Distillation yielded 21.5 grams of clear colorless

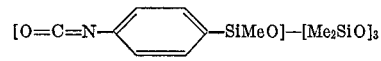

in 98 mole percent yield; B.P. 97–98° C./0.033 millimeter Hg, $n^{25}$ 1.4622.

Calculated for C$_{14}$H$_{25}$Si$_4$NO$_5$: 41.4% N; 6.2% H; 29.2% Si; 3.45% N; 10.4% NCO. Analysis: 42.0% N; 6.4% H; 27.9% Si; 3.6% N; 10.5% NCO.

Infrared spectra showed strong N=C=O absorption and verifies structure. This example illustrates the stability of aminosilicones of the [Me$_2$SiO]$_x$ polymer structure to phosgene up to 100° C. The aminosilicone of this example contained no (CH$_3$)$_3$SiO or organooxysilyl units.

EXAMPLE 9

Into a 500 milliliter, 3-necked flask fitted as described in Example 3 was charged 100 milliliters of toluene plus 100 grams of phosgene and the mixture was cooled to —20° C. Over 20 minutes was added 43 grams of

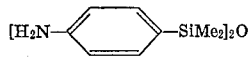

diluted to 100 milliliters with toluene. The mixture was heated to 100° C. under nitrogen purge to remove dissolved gases, stripped of toluene and distilled. There was obtained 14.5 grams (0.068 mole) of

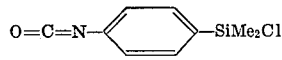

in 27 mole-percent yield (B.P. 70°C./.150 millimeter Hg, $n^{25}$ 1.5293, N.E. 213 [211.72 calculated]) and 36 grams of

in 70 mole percent yield (B.P. 149–151° C./0.090 millimeter Hg, $n^{25}$ 1.5328–1.5258 N.E. 176 [184.2 calculated]).

This example illustrates the extensive cleavage of

during phosgenation.

What is claimed is:

1. Fluid condensable isocyanatoorganosiloxanes of the formula:

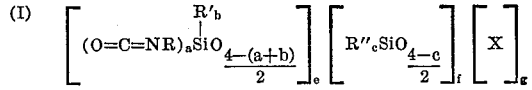

wherein R is divalent hydrocarbon radical having 3 to 10 carbon atoms which is bonded to silicon by a carbon to silicon bond and separates the O=C=N— from the silicon atom by a chain of at least 3 carbon atoms; R' is an inert monovalent organic radical bonded to silicon by a carbon to silicon bond from the group consisting of monovalent hydrocarbon, halogenated monovalent hydrocarbon, and cyanoalkyl; X is a member selected from the group consisting of chlorine, alkoxy, aroxy, acyloxy, 2-chloroalkoxy,

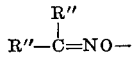

and mixtures thereof; $a$ has a value of 1 to about 3, $b$ has a value of 0 to about 2; with the proviso that the value of $(a+b)$ is not greater than 3; R'' represents hydrogen or R'; $c$ is 0 to 3; $e$ is a number equal to at least 1; $f$ i 0 or a positive number and $g$ is a positive number, and the sum of $e$ and $f$ is a number of at least 2.

2. The isocyanatoorganosiloxane of claim 1 wherein R is —$CH_2CH_2CH_2$—, R' is methyl, R'' is methyl, X is —OR' wherein R' thereof is phenyl, $a$ is 1, $b$ is 1, $c$ is 2, $e$ is at least 1, $f$ is a positive number and $g$ is a positive number.

3. The isocyanatoorganosiloxane of claim 1 where R is

R' is methyl, R'' is methyl, X is —OR— wherein R' thereof is phenyl, $a$ is 1, $b$ is 1, $c$ is 2, $e$ is at least 1, $f$ is a positive number and $g$ is a positive number.

4. The process of producing fluid condensable isocyanatoorganosiloxanes which comprises phosgenating a fluid aminoorganosiloxane of the formula:

(II)

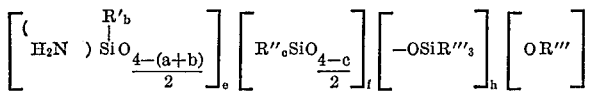

wherein R is a divalent hydrocarbon radical having 3 to 10 carbon atoms which is bonded to silicon by a carbon to silicon bond and separates the N from the silicon atom by a chain of at least 3 carbon atoms; R' is an inert monovalent organic radical bonded to silicon by a carbon to silicon bond from the group consisting of monvalent hydrcarbon, halogenated monovalent hydrocarbon, and cyanoalkyl; R'' is hydrogen or R', R''' is a monovalent organic radical, $a$ has a value of 1 to about 3; $b$ has a value of 0 to about 2; with the proviso that the value of $(a+b)$ is not greater than 3; $c$ is 0 to 3; $e$ is a number equal to at least 1; $f$ is 0 or a positive number; the sum of $e$ and $f$ is a number of at least 2; $h$ is 0 or a positive number; $i$ is 0 or a positive number, and the sum of $h$ and $i$ is at least a positive number.

5. The process of claim 4 wherein the phosgenated product contains silicon bonded chlorine and such product is reacted with a member selected from the group consisting of 1,2-alkylene oxide, alkanol, phenol, lower fatty acid, ketoxines and aldoxines to remove such chlorine from the product.

6. The process of claim 5 wherein such member is reacted with such product in the presence of a tertiary aminehydrohalide acceptor.

References Cited

UNITED STATES PATENTS

| | | | |
|---|---|---|---|
| 3,093,451 | 6/1963 | Weisse et al. | 260—448.2X |
| 3,170,891 | 2/1965 | Speier | 260—448.2X |
| 3,178,391 | 4/1965 | Holtschmidt et al. | 260—448.2X |
| 3,179,622 | 4/1965 | Haluska | 260—448.2X |
| 3,179,713 | 4/1965 | Brown | 260—448.2X |

TOBIAS E. LEVOW, Primary Examiner

P. F. SHAVER, Assistant Examiner

U.S. Cl. X.R.

260—398, 448.8R, 448.2E

UNITED STATES PATENT OFFICE
CERTIFICATE OF CORRECTION

Patent No. 3,584,024                 Dated June 8, 1971

Inventor(s) Enrico J. Pepe

It is certified that error appears in the above-identified patent and that said Letters Patent are hereby corrected as shown below:

| | |
|---|---|
| Column 1, line 72; | After "reacting a" insert --silane or-- |
| Column 6, line 48; | After "1 to 7" insert --carbon-- |
| Column 9, line 72; | "28" should read --.28-- |
| Column 10, line 11; | "3:5%" should read --3.5%-- |
| Column 11, line 15, | "i" should read --is-- |
| Last formula in Column 11 | In the Formula $(H_2N)$ should read -- $(H_2NR)_a$ |

Signed and sealed this 17th day of September 1974.

(SEAL)
Attest:

McCOY M. GIBSON JR.
Attesting Officer

C. MARSHALL DANN
Commissioner of Patents